United States Patent
Ellison et al.

(10) Patent No.: US 9,495,190 B2
(45) Date of Patent: Nov. 15, 2016

(54) ENTROPY POOLS FOR VIRTUAL MACHINES

(75) Inventors: Carl M. Ellison, Seattle, WA (US); Scott A. Field, Redmond, WA (US); Brandon S. Baker, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 869 days.

(21) Appl. No.: 12/546,167

(22) Filed: Aug. 24, 2009

(65) Prior Publication Data

US 2011/0047545 A1 Feb. 24, 2011

(51) Int. Cl.
*G06F 1/02* (2006.01)
*G06F 9/455* (2006.01)
*G06F 7/58* (2006.01)

(52) U.S. Cl.
CPC ............ *G06F 9/45558* (2013.01); *G06F 7/588* (2013.01); *G06F 7/58* (2013.01); *G06F 7/584* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 6,986,052 B1* | 1/2006 | Mittal | 713/190 |
| 7,222,062 B2 | 5/2007 | Goud et al. | |
| 2003/0076956 A1 | 4/2003 | Shackleford et al. | |
| 2003/0115453 A1 | 6/2003 | Grawrock | |
| 2003/0229802 A1 | 12/2003 | Challener et al. | |
| 2006/0072747 A1 | 4/2006 | Wood et al. | |
| 2006/0184936 A1* | 8/2006 | Abels | G06F 9/5077 718/1 |
| 2007/0061535 A1* | 3/2007 | Xu et al. | 711/167 |
| 2007/0171921 A1* | 7/2007 | Wookey | G06F 3/1415 370/401 |
| 2007/0203943 A1 | 8/2007 | Adlung et al. | |
| 2007/0230693 A1* | 10/2007 | Mueller | G06F 7/582 380/46 |
| 2007/0230694 A1 | 10/2007 | Rose et al. | |
| 2008/0046680 A1* | 2/2008 | Nagata et al. | 711/207 |

(Continued)

FOREIGN PATENT DOCUMENTS

| | | |
|---|---|---|
| JP | 2003051819 | 2/2003 |
| JP | 2003535377 | 11/2011 |

(Continued)

OTHER PUBLICATIONS

Garfinkel, et al., "When Virtual is Harder than Real: Security Challenges in Virtual Machine Based Computing Environments", retrieved at <<http://www.stanford.edu/~talg/papers/HOTOS05/virtual-harder-hotos05.pdf>>, pp. 6.

(Continued)

*Primary Examiner* — Henry Tsai
*Assistant Examiner* — Aurangzeb Hassan
(74) *Attorney, Agent, or Firm* — Timothy Churna; Dan Choi; Micky Minhas

(57) ABSTRACT

In the host operating system of a computing device, entropy data is collected based at least in part on each of one or more hardware components of the computing device. An entropy pool is updated based at least in part on the collected entropy data, and data from the entropy pool is provided to a guest operating system running as a virtual machine of the computing device. The guest operating system maintains a guest operating system entropy pool based on the data from the entropy pool provided by the host operating system. The guest operating system accesses the guest operating system entropy pool and uses the guest operating system entropy pool as a basis for generating values including random numbers.

22 Claims, 5 Drawing Sheets

(56) References Cited

U.S. PATENT DOCUMENTS

| | | | |
|---|---|---|---|
| 2008/0098482 A1 | 4/2008 | Hughes | |
| 2008/0155169 A1* | 6/2008 | Hiltgen | G06F 9/5077 711/6 |
| 2008/0189356 A1 | 8/2008 | Thomas et al. | |
| 2008/0209429 A1* | 8/2008 | Van Riel et al. | 718/104 |
| 2008/0229114 A1* | 9/2008 | Okabe | 713/189 |
| 2008/0256151 A1* | 10/2008 | Acar | G06F 7/58 708/250 |
| 2009/0089879 A1 | 4/2009 | Wang et al. | |
| 2009/0113111 A1* | 4/2009 | Chen et al. | 711/6 |
| 2009/0125902 A1* | 5/2009 | Ghosh | G06F 9/45533 718/1 |
| 2009/0144534 A1* | 6/2009 | Calhoon et al. | 713/2 |
| 2009/0182928 A1* | 7/2009 | Becker | G06F 9/45558 711/6 |
| 2009/0204964 A1* | 8/2009 | Foley | G06F 21/53 718/1 |
| 2009/0307689 A1* | 12/2009 | Sudhakar | 718/1 |
| 2010/0023749 A1 | 1/2010 | Kelly | |
| 2010/0088698 A1* | 4/2010 | Krishnamurthy | 718/1 |
| 2010/0106756 A1* | 4/2010 | Ellison | G06F 7/58 708/212 |
| 2010/0235831 A1* | 9/2010 | Dittmer | 718/1 |
| 2010/0299368 A1* | 11/2010 | Hutchins et al. | 707/803 |

FOREIGN PATENT DOCUMENTS

| | | |
|---|---|---|
| RU | 2313125 C1 | 12/2007 |
| WO | WO 2007007805 | 1/2007 |
| WO | 2009013673 A2 | 1/2009 |

OTHER PUBLICATIONS

Albertsson, Lars, "Entropy Injection", retrieved at <<http://eprints.sics.se/2398/01/SICS-T—2007-02—SE.pdf>>, SICS Technical Report T2007:02, Aug. 25, 2006, pp. 42.

"Trusted Platform Module", retrieved at <<http://en.wikipedia.org/wiki/Trusted_Platform_Module>>, 1.2 Revision 103, Jul. 9, 2007, pp. 3.

"International Search Report", Mailed Date: Apr. 28, 2011, Application No. PCT/US2010/045474, Filed Date: Aug. 13, 2010, pp. 8.

"Extended European Search Report", European Patent Application No. 1081415.8, (Jan. 3, 2013), 10 pages.

Van Heausden, "Entropy Broker", Retrieved from <:http:ffweb.archive.orgjweb/20090620185809/http://www.vanheusden.comjentropybroker> on Dec. 11, 2012, (Jun. 20, 2009), 2 pages.

"Foreign Office Action", CN Application No. 201080037813.8, Aug. 26, 2014, 14 Pages.

"Foreign Office Action", JP Application No. 2012-526828, Sep. 26, 2014, 9 Pages.

"Foreign Office Action", CN Application No. 201080037813.8, Mar. 3, 2015, 11 Pages.

"Foreign Office Action", RU Application No. 2012106610, Dec. 10, 2014, 7 pages.

"Foreign Office Action", CN Application No. 201080037813.8, Jan. 6, 2014, 13 Pages.

"Foreign Notice of Allowance", JP Application No. 2012-526828, Apr. 2, 2015, 4 Pages.

The Chineses Office Action mailed Mar. 23, 2016 for Chinese patent application No. 201080037813.8, a counterpart foreign application of U.S. Appl. No. 12/546,167.

"Notice of Allowance Issued in Russian Patent Application No. 2012106610", Mailed Date: Jan. 29, 2016, 14 Pages. (W/o English Translation).

"Fourth Office Action Issued in Chinese Application No. 201080037813.8", Mailed Date: Sep. 24, 2015, 10 Pages.

"Office Action Issued in Russian Application No. 2012106610", Mailed Date: Sep. 29, 2015, 3 Pages. (w/o English Translation).

The Korean Office Action mailed May 16, 2016 for Korean Patent Application No. 10-2012-7004750, a counterpart foreign application of U.S. Appl. No. 12/546,167, 15 pages.

* cited by examiner

ENTROPY POOLS FOR VIRTUAL MACHINES

BACKGROUND

Random numbers can be used in a variety of different computing scenarios. One common usage scenario is cryptography, where a cryptographic key and cryptographic processes rely on generation of random numbers. The generation of random numbers oftentimes relies on the state of one or more hardware components in a computer. However, such reliance can be problematic when a virtual machine is running on the computer. A virtual machine abstracts the hardware components in a computer and presents them as virtual components to the operating system running in the virtual machine. Such virtual components can have less randomness, or entropy, than their corresponding hardware components, which can reduce the entropy of the generated numbers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an entropy pool of a program managed by a virtual machine manager in a computing device is generated based at least in part on each of one or more hardware components of the computing device. The program accesses the entropy pool and uses the entropy pool as a basis for generating a random number.

In accordance with one or more aspects, in a host operating system of a computing device, entropy data is collected based at least in part on each of one or more hardware components of the computing device. An entropy pool is updated based at least in part on the collected entropy data, and is provided to a guest operating system running as a virtual machine of the computing device.

BRIEF DESCRIPTION OF THE DRAWINGS

The same numbers are used throughout the drawings to reference like features.

DETAILED DESCRIPTION

Entropy pools for virtual machines is discussed herein. An entropy pool based on hardware components in a computing device is generated and updated by the host operating system of the computing device. A virtual machine running a guest operating system can also be run on the computing device. The guest operating system has an entropy pool that is generated based at least in part on the host operating system entropy pool, providing the guest operating system an entropy pool based at least in part on hardware components even though the guest operating system is running in a virtual machine.

Additionally, a sequence counter value can be maintained by the guest operating system. Each time a copy or clone of a guest operating system is made, the sequence counter value of one of the guest operating systems is incremented. Additionally, each time a value based on an entropy pool of the guest operating system is obtained, a record of the obtained value and the current sequence counter value of the guest operating system at the time the value is obtained is stored. When a value based on the entropy pool of the guest operating system is used, the stored sequence counter value for the value is compared to the current sequence counter value of the guest operating system, and the value is used only if the two counter values are the same.

Figure 1:
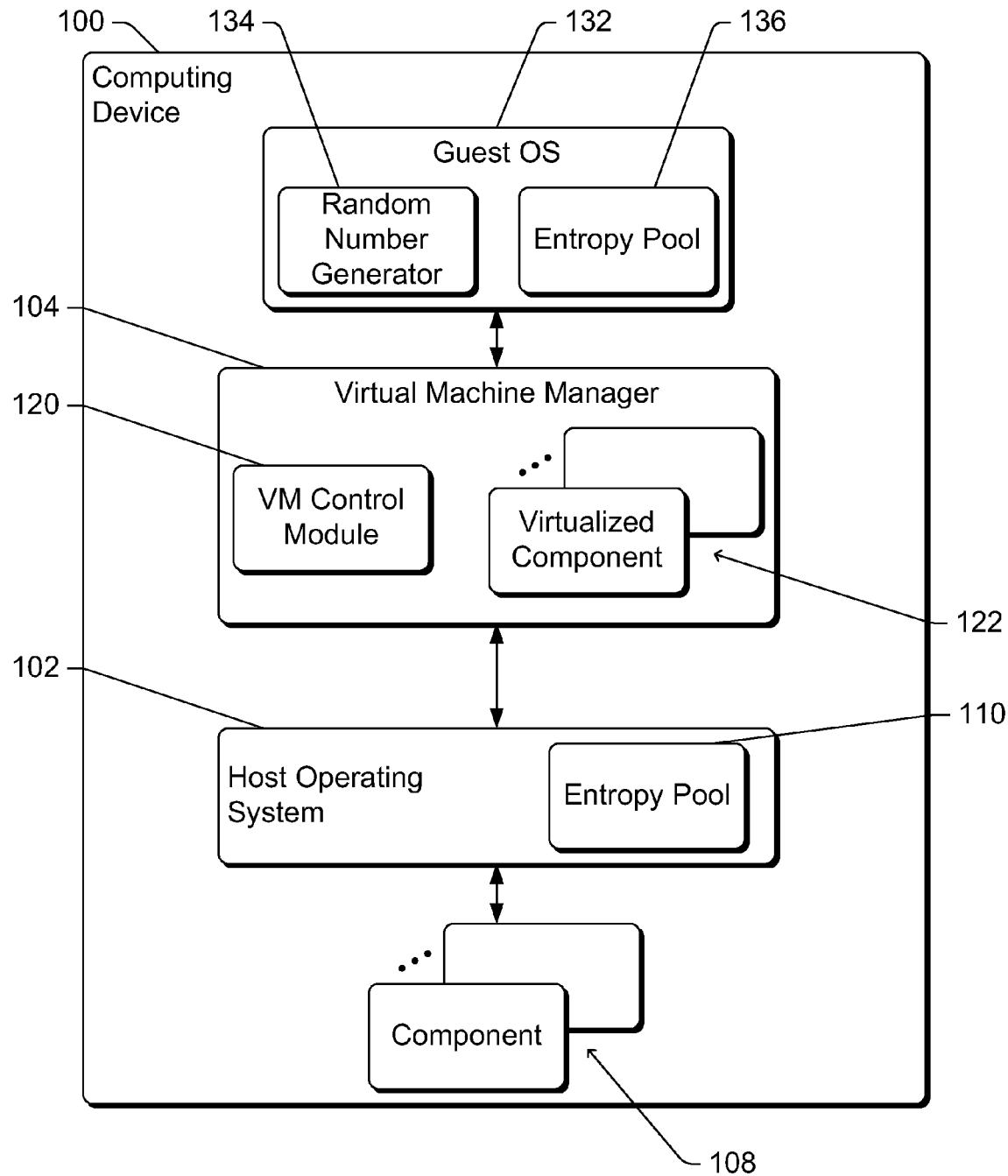
FIG. 1 is a block diagram illustrating an example computing device implementing the entropy pools for virtual machines in accordance with one or more embodiments.

FIG. 1 is a block diagram illustrating an example computing device 100 implementing the entropy pools for virtual machines in accordance with one or more embodiments. Computing device 100 can be a variety of different types of devices. For example, computing device 100 can be a desktop computer, a mobile station, a netbook, an entertainment appliance, a set-top box communicatively coupled to a display device, a television, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes a host operating system 102 and a virtual machine manager 104. Host operating system 102 manages access to the functionality provided by one or more components 108. Components 108 can be a variety of different input/output (I/O) components as well as other components or devices. For example, components 108 can include one or more of memory components, storage devices, communication components, and so forth. Various other components or modules running on computing device 100, including virtual machine manager 104, can access this functionality managed by host operating system 102 even though such components or modules may not access a component 108 directly.

Host operating system 102 also includes an entropy pool 110. Generally, an entropy pool is a set of data or bits that provides a source of randomness to computing device 100. The entropy pool is generated based on data collected from one or more entropy sources, and is drawn from by a random number generator and/or other component as a source of randomness.

One or more virtual machine (VM) managers can be run on host operating system 102. A virtual machine manager allows one or more additional programs to run on computing device 100. These programs can be operating systems, each referred to as a guest operating system, or alternatively other programs. The virtual machine manager presents to the guest operating system a virtualized hardware system in which the guest operating system runs. Accordingly, the guest operating system running in the virtualized hardware system is also referred to as a virtual machine. The guest operating system runs on this virtualized hardware system oftentimes without knowledge that its hardware resources are virtualized. Virtual machines support various usage scenarios, including allowing I/O components to be presented to the guest operating system in different manners (e.g., emulated, synthetic, virtual, passthrough, as different components, with different communication protocols, and so forth).

In FIG. 1, virtual machine manager 104 includes a virtual machine control module 120 and one or more virtualized components 122. Virtual machine control module 120 manages the virtualized hardware system, communicating with guest operating system 132. Virtualized components 122 are virtualized hardware components that are presented by virtual machine control module 120 to guest operating system 132 as hardware components. Virtualized components 122 can be the same types of components as components 108, or alternatively different types of components. Guest operating system 132 communicates with control module 120 and/or virtualized component 122 as if guest operating system 132 were communicating with the physical hardware of computing device 100. Although computing device 100 is discussed herein with reference to guest operating system 132, alternatively other programs other than operating systems can be run in the virtual machine.

Guest operating system 132 includes a random number generator 134 and an entropy pool 136. Entropy pool 136 is discussed herein as being used by random number generator 134, although it is to be appreciated that entropy pool 136 can alternatively be used by other components of guest operating system 132. Random number generator 134 is a deterministic system designed to imitate or approximate a true random generator. Accordingly, random number generator 134 can also be referred to as a pseudo-random number generator. Random number generator 134 can generate random numbers in one or more of a variety of different manners. In one or more embodiments, random number generator 134 generates random numbers based on data referred to as a seed value obtained from entropy pool 136. Random number generator 134 can apply a variety of different algorithms to the seed value to obtain random numbers, such as a one of the Secure Hash Algorithm (SHA) functions (e.g., SHA-512), a standard symmetric cryptographic algorithm (e.g., an Advanced Encryption Standard (AES)), and so forth.

The data stored as an entropy pool (e.g., entropy pool 136 or entropy pool 110) is generated based on the values from one or more entropy sources. An entropy source is a source of data or values having some amount of randomness. A variety of different sources can be used as entropy sources for an entropy pool. For example, system information such as various system clocks or timers, how many page faults have occurred, how much free RAM is available, occupied disk drive space, free disk drive space, system look aside information, system interrupt information, and so forth can each be an entropy source. Network information such as numbers of packets received or sent, network packet timings, addresses from which network packets are received, and so forth can each be an entropy source. The timing or content of mouse movements, keystrokes, voice inputs, and other similar events can each be an entropy source.

Existing hardware sources on a computing system can also serve as entropy sources. The data from a sound or video input with (or without) a source plugged into it can be entropy sources. Disk drives may have small random fluctuations in their rotational speed due to chaotic air turbulence that can be measured by low level disk seek time instrumentation and used as an entropy source. Unique (or nearly unique) hardware IDs and serial numbers, including hard drive serial numbers and BIOS firmware tables, can be used as an entropy source.

A hardware random number generator included in, or coupled to, device 100 can also be an entropy source. A hardware random number generator refers to a special-purpose hardware component that produces a random output. For example, such a hardware random number generator can be based on amplified noise generated by an electronic circuit, environmental acoustic noise, quantum effects in a semiconductor, timing of radioactive decays, and so forth.

The data from an entropy source can be incorporated into an entropy pool (e.g., entropy pool 110 or 136) in a variety of different manners. In one or more embodiments, the data from an entropy source is hashed to generate a hash value that is incorporated into the entropy pool, or alternatively the data itself from the entropy source can be incorporated into the entropy pool. The incorporation of the data into the entropy pool can be performed, for example, by concatenating the data to the entropy pool, inserting at least a portion of the data into one or more locations of the entropy pool, and so forth.

Host operating system 102 obtains data from one or more entropy sources and incorporates the obtained data into entropy pool 110. Host operating system 102 obtains the data based on components 108. Accordingly, entropy pool 110 is based on hardware entropy sources.

Entropy pool 136 is included in guest operating system 132, which is running in a virtual machine. Virtual machine control module 120 accesses entropy pool 110 and makes at least part of the data from entropy pool 110 available to entropy pool 136. The data from entropy pool 110 can be made available to entropy pool 106 in a variety of different manners, as discussed in more detail below. Thus, even though entropy pool 136 is part of a guest operating system in a virtual machine, entropy pool 136 is still based on hardware entropy sources.

In one or more embodiments, host operating system 102 provides data from entropy pool 110 to guest operating system 132 via a virtualized component 122. When guest operating system 132 is booted or otherwise begins running, host operating system 102 obtains data from entropy pool 110. This data obtained from entropy pool 110 is stored in a virtualized component 122, such as by mapping the data into a memory space of a virtualized component 122. The virtualized component 122 in turn is accessed by guest operating system 132 and used as (or added to) entropy pool 136. Accordingly, guest operating system 132 has an entropy pool 136 based on hardware entropy sources.

The amount of data from entropy pool 110 that is provided by host operating system 102 can vary. For example, the amount of data from entropy pool 110 that is provided by host operating system 102 can be a predetermined number of bits, a predetermined percentage or amount of entropy pool 110, all the data in entropy pool 110, and so forth.

In one or more embodiments, the virtualized component 122 in which the data from entropy pool 110 is stored is a BIOS (basic input/output system) table that is accessed by guest operating system 132. Host operating system 102 maps the data from entropy pool 110 into particular memory space of virtual machine manager 104, this memory space being the memory space where the BIOS table that guest operating system 132 uses is stored. Accordingly, in addition to the data typically included in the BIOS table, the entropy data from entropy pool 110 is also included in the BIOS table. It is to be appreciated, however, that the use of a BIOS table is only an example, and that the data from entropy pool 110 can be stored in a variety of different virtualized components.

The memory space of a virtualized component 122 where the data from entropy pool 110 is stored is typically a part of the virtualized component 122 that is otherwise not used by or need by the virtualized component 122 or guest operating system 132 for proper functioning. For example, a portion of the BIOS table that is irrelevant for the guest operating system 132 to function properly can be used as the part of the BIOS table into which the data from entropy pool 110 is stored.

Host operating system 102 continues to collect entropy data based on components 108 and adds the entropy data to entropy pool 110. This collection of entropy data by host operating system 102 continues independently of the collection and/or use of entropy data by guest operating system 132.

In addition to, or alternatively in place of, providing data from entry pool 110 to guest operating system 132 when guest operating system 132 is booted, data from entropy pool 110 can be provided to guest operating system 132 while guest operating system 132 is running. In such situations, virtual machine control module 120 supports a communication interface between guest operating system 132 and host operating system 102 allowing data from entropy pool 110 to be provided to entropy pool 136. This allows the data in entropy pool 136 to be updated based on hardware entropy sources after guest operating system 132 is booted.

In one or more embodiments, guest operating system 132 requests additional entropy when desired. Guest operating system 132 can determine when additional entropy is desired in a variety of different manners, such as at regular or irregular intervals, in response to a determination that the available data in entropy pool 136 drops below a threshold amount, and so forth. When additional entropy is desired, guest operating system 132 sends a request to host operating system 102 (via virtual machine manager 104) for additional entropy. In response to such a request, host operating system 102 returns additional data from entropy pool 110. The amount of data from entropy pool 110 that is returned can vary. For example, the amount of data from entropy pool 110 that is returned can be a predetermined number of bits, a number of bits requested by guest operating system 132, all the data in entropy pool 110, and so forth.

In other embodiments, host operating system 102 sends entropy data to guest operating system 132 (via virtual machine manager 104) at regular or irregular intervals. This timing of when host operating system 102 sends the entropy can vary, such as being on a predetermined schedule (e.g., every ten minutes), in response to entropy pool 110 containing a threshold amount of data, and so forth. The data sent to guest operating system 132 is stored in entropy pool 136, making the data available to random number generator 134 when desired without guest operating system 132 sending a request for additional entropy to host operating system 102.

The data in entropy pool 136 can be obtained entirely from entropy pool 110, or alternatively can be obtained from other entropy sources as well. For example, one or more virtualized components 122 can be used as entropy sources by guest operating system 132, with data obtained from such entropy sources being incorporated into entropy pool 136.

Figure 2:
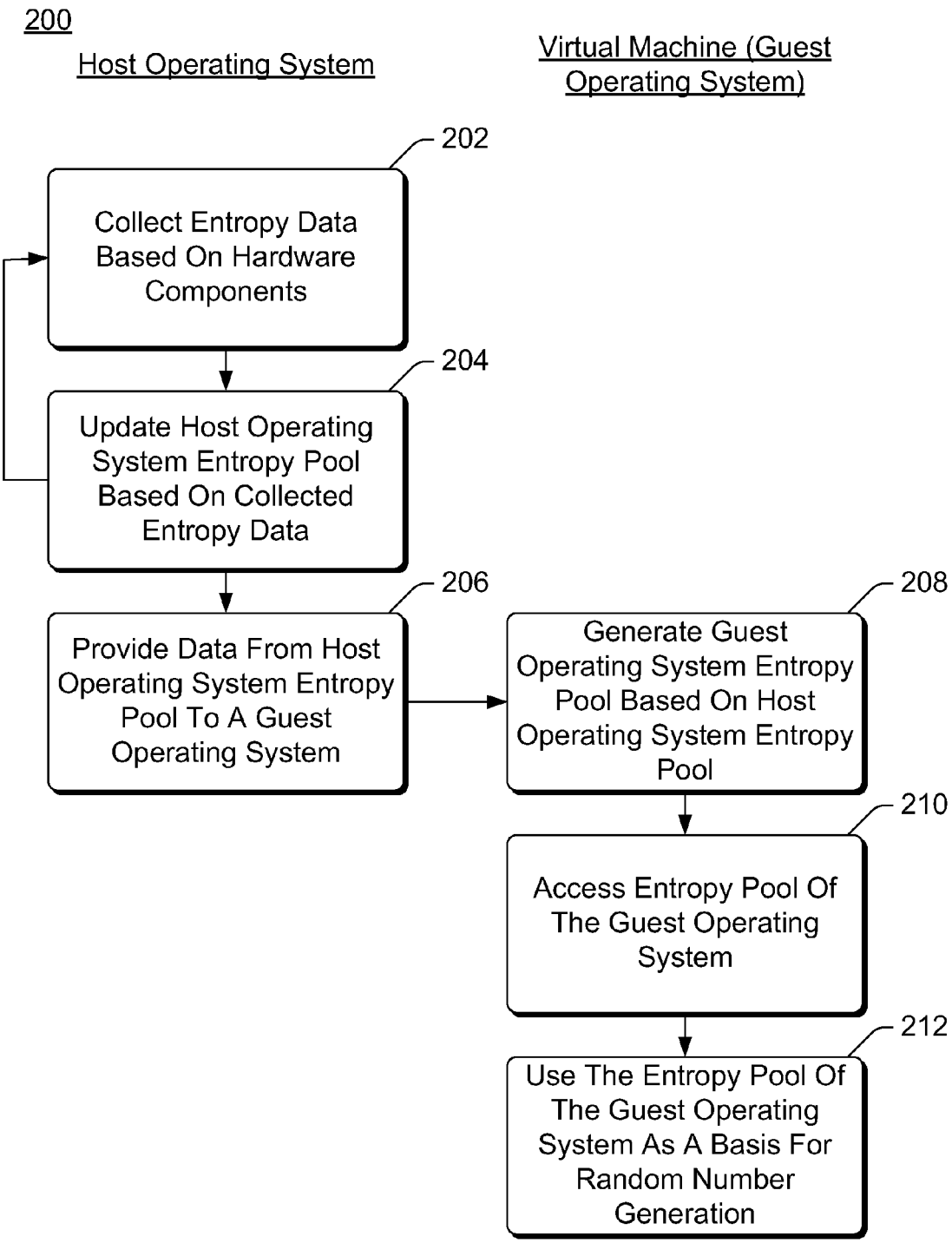
FIG. 2 is a flowchart illustrating an example process for obtaining and providing entropy for a virtual machine in accordance with one or more embodiments.

FIG. 2 is a flowchart illustrating an example process 200 for obtaining and providing entropy for a virtual machine in accordance with one or more embodiments. Process 200 can be implemented in software, firmware, hardware, or combinations thereof. Acts of process 200 illustrated on the left-hand side of FIG. 2 are carried out by a host operating system of a computing device, such as host operating system 102 of FIG. 1. Acts of process 200 illustrated on the right-hand side of FIG. 2 are carried out by a virtual machine of the computing device, such as guest operating system 132 of FIG. 1. Process 200 is shown as a set of acts and is not limited to the order shown for performing the operations of the various acts. Process 200 is an example process for obtaining and providing entropy for a virtual machine; additional discussions of obtaining and providing entropy for a virtual machine are included herein with reference to different figures.

In process 200, the host operating system collects entropy data based on hardware components (act 202). This entropy data can be collected from a variety of different entropy sources as discussed above.

The entropy pool of the host operating system is updated based on the collected entropy data (act 204). The collected entropy data can be incorporated into the entropy pool of the host operating system in a variety of different manners as discussed above.

Acts 202 and 204 can be repeated multiple times, with the host operating system continually collecting new entropy data and updating the entropy pool of the host operating system based on that new entropy data. This collection and updating in acts 202 and 204 can continue independently of whether the guest operating system is accessing or using the guest operating system entropy pool.

The host operating system provides data from the entropy pool of the host operating system to the guest operating system (act 206). The data from the entropy pool can be provided to the guest operating system when the operating system is booted and/or at other times while the guest operating system is running as discussed above.

The guest operating system generates the entropy pool of the guest operating system based at least in part on the entropy pool of the host operating system (act 208). The data from the host operating system entropy pool provided by the host operating system in act 206 can be used as, or added to, the guest operating system entropy pool.

The guest operating system accesses the entropy pool of the guest operating system (act 210), which is based at least in part on the entropy pool updated by the host operating system in act 204. The entropy pool can also optionally include data obtained by the guest operating system from other entropy sources.

The guest operating system uses the entropy pool of the guest operating system as a basis for random number generation (act 212). The guest operating system can also use the entropy pool of the guest operating system for other operations and/or to obtain values where entropy is desired other than random number generation.

It should be noted that acts 206 and 208 can be repeated multiple times while the guest operating system is running, allowing the entropy pool of the guest operating system to be repeatedly updated with new entropy data.

Returning to FIG. 1, situations can arise where a virtual machine can be cloned. Cloning of a virtual machine refers to duplicating the virtual machine, including any applications running on the virtual machine as well as data describing the current state of the virtual machine (e.g., various settings of the guest operating system). This duplicating results in two identical copies of the virtual machine. Cloning can be performed at various times, such as when the virtual machine is dormant (not running) or when the virtual machine is running. Cloning can also be used to save a copy of the virtual machine, referred to as a snapshot, allowing computing device 100 to be rolled back to those saved settings. Cloning can be performed in response to requests from a user and/or from other components or modules in computing device 100.

Allowing virtual machines to be cloned, however, can present problems with entropy pool 136. Situations can arise where, after cloning, two virtual machines have the same entropy pool, which can result in reduced randomness or introduce predictability of random numbers due to re-use of the numbers generated by random number generator 134. In one or more embodiments, a sequence counter is used to distinguish different virtual machines as discussed in more detail below.

Figure 3:
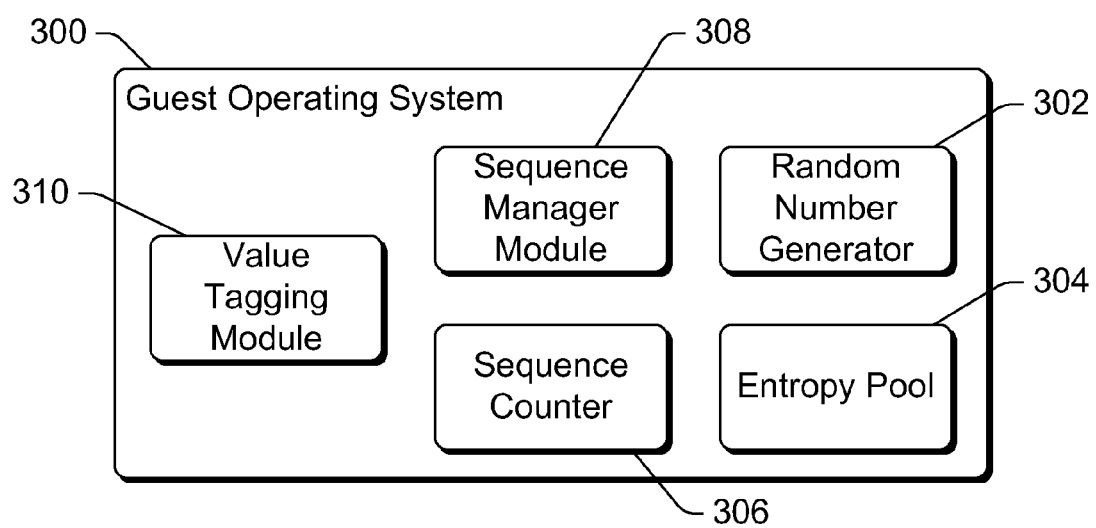
FIG. 3 is a block diagram illustrating an example guest operating system implementing the entropy pools for virtual machines in accordance with one or more embodiments.

FIG. 3 is a block diagram illustrating an example guest operating system 300 implementing the entropy pools for virtual machines in accordance with one or more embodiments. Guest operating system 300 can be, for example, a guest operating system 132 of FIG. 1. Guest operating system 300 runs as a virtual machine in a virtualized hardware system, analogous to guest operating system 132 of FIG. 1.

Guest operating system 300 includes a random number generator 302, an entropy pool 304, a sequence counter 306, a sequence manager module 308, and a value tagging module 310. Random number generator 302 generates a random number based on entropy pool 304, analogous to random number generator 134 and entropy pool 136 of FIG. 1.

Sequence counter 306 is a counter value that distinguishes the guest operating system 300 from other guest operating systems resulting from cloning in the same family tree branch as guest operating system 300 (e.g., which are children or other descendants of guest operating system 300, or parents or other ancestors of guest operating system 300). In one or more embodiments, sequence counter 306 has a numeric value, although values in other lists of known order can also be used.

When a guest operating system is cloned, the sequence counter 306 of one of the guest operating systems is incremented while the sequence counter 306 of the other guest operating system is kept unchanged. If one of the copies of the operating system keeps running after the cloning then that operating system is the operating system having its sequence counter keep its value; otherwise, either operating system copy can have its sequence counter incremented. For example, if a snapshot of a running guest operating system were to be taken, then the running guest operating system keeps its sequence counter value while the saved snapshot copy has its sequence counter value incremented (e.g., by 1). By way of another example, if a clone of a dormant guest operating system were made, then one of the two copies of the guest operating system would have its sequence counter incremented (e.g., by 1) while the other keeps its sequence counter value.

Sequence counter 306 of one of the guest operating systems can be incremented in a variety of different manners. In one or more embodiments, the host operating system or other component managing the cloning of the guest operating system increments the sequence counter 306 of one of the guest operating systems. In other embodiments, one of the guest operating system increments its own sequence counter 306. For example, the host operating system or other component managing the cloning of the guest operating system can set a flag or other indicator that the guest operating system has been cloned. This flag or other indicator can be detected by a copy of the guest operating system the next time it is booted, causing the guest operating system to update its sequence counter 306.

Sequence manager module 308 and value tagging module 310 use sequence counter 306 to ensure that the randomness of values generated based on entropy pool 304 is not compromised due to cloning. Value tagging module 310 obtains the current value of sequence counter 306 each time a value based on entropy pool 304 is generated. Examples of such generated values include random numbers generated by random number generator 302, cryptographic keys generated based on a random number, and so forth. Each time a value based on entropy pool 304 is generated, module 310 stores with that generated value the current value of sequence counter 306. Accordingly, stored with each generated value is an associated indication of the sequence counter value for which it is valid.

When a value generated based on entropy pool 304 is used, sequence manager module 308 retrieves the stored sequence counter value for that generated value. The stored sequence counter value is compared to the current value of sequence counter 306. If the stored sequence counter value is the same as the current value of sequence counter 306, then the value generated based on entropy pool 304 can be used. However, if the stored sequence counter value is not the same as (e.g., is less than) the current value of sequence counter 306, then the value generated based on entropy pool 304 is not to be used.

If the value generated based on entropy pool 304 is not to be used, then a new value is generated by guest operating system 300. Additionally, entropy pool 304 is cleared and regenerated (e.g., based on the entropy pool of the host operating system as discussed above). It should be noted that entropy pool 304 can optionally be cleared and regenerated only once for guest operating system 300 for a particular sequence counter value. For example, if a first value generated based on entropy pool 304 is attempted to be used, but is not used because the stored sequence counter value is less than the current value of sequence counter 306, then the entropy pool 304 is cleared and regenerated. If a second value generated based on entropy pool 304 is attempted to be used but is not used because the stored sequence counter value is less than the current value of sequence counter 306, then entropy pool 304 need not be cleared and regenerated again if the current value of sequence counter 306 when the second value is attempted to be used is the same as the current value of sequence counter 306 when the first value is attempted to be used because entropy pool 304 has already been cleared and regenerated.

For example, assume that a random number has been generated by a guest operating system in order to be used as an encryption key to provide a secure communication channel. Further assume that the guest operating system has a current sequence counter value of 3 at the time the encryption key is generated. When the encryption key is generated, value tagging module 310 stores a record of the sequence counter value being 3 for the encryption key.

Continuing with this example, assume that a snapshot is then taken to store a copy of the guest operating system. The running guest operating system maintains its sequence counter value of 3, but the snapshot copy of the guest operating system has its sequence counter value incremented to 4. If the running guest operating system were to attempt to continue to use the encryption key to provide a secure communication channel, then the sequence counter value of the running guest operating system (which is 3) is the same as the sequence counter value recorded for the encryption key, so the encryption key can be used by the running guest operating system. However, if the snapshot copy of the guest operating system were to attempt to run and use the encryption key to provide a secure communication channel, then the sequence counter value recorded for the encryption key (which is 3) is less than the sequence counter value of snapshot copy of the guest operating system being run (which is 4), so the encryption key would not be used.

It should be noted, however, that when the value generated based on entropy pool 304 is a key used for encryption and decryption, a record of the generated value is maintained even if the sequence counter value recorded for the encryption key is less than the sequence counter value of the snapshot copy of the guest operating system being run. By maintaining a record of the generated value, the generated value can still be used to decrypt data that was encrypted based on the generated value.

Figure 4:
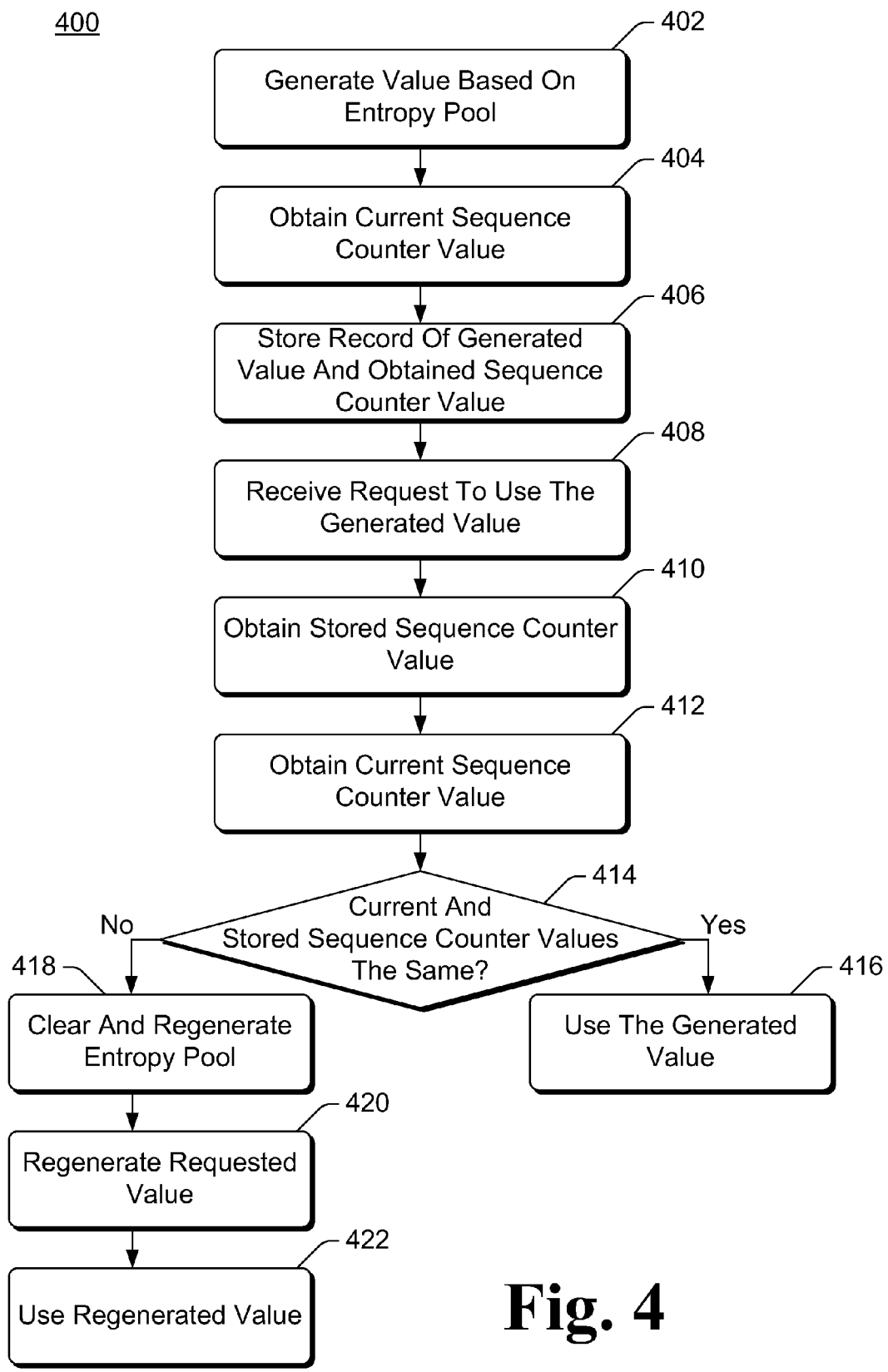
FIG. 4 is a flowchart illustrating an example process for a guest operating system using sequence counters in accordance with one or more embodiments.

FIG. 4 is a flowchart illustrating an example process 400 for a guest operating system using sequence counters in accordance with one or more embodiments. Process 400 is carried out by a guest operating system, such as guest operating system 300 of FIG. 3, and can be implemented in software, firmware, hardware, or combinations thereof. Process 400 is shown as a set of acts and is not limited to the order shown for performing the operations of the various acts. Process 400 is an example process for a guest operating system using sequence counters; additional discussions of a guest operating system using sequence counters are included herein with reference to different figures.

In process 400, a value based on an entropy pool is generated (act 402). A variety of different values can be generated in act 402, such as a random number, a cryptographic key, and so forth as discussed above.

A current sequence counter value of the guest operating system implementing process 400 is obtained (act 404), and a record of the generated value and the current sequence counter value is stored (act 406).

A request to use the generated value is subsequently received (act 408). The request can be received from a component or module of the guest operating system implementing process 400, from another component or module, from a user, etc. In response to the request, the sequence counter value stored with the generated value is obtained (act 410). The current sequence counter value of the guest operating system implementing process 400 is also obtained (act 412).

The guest operating system then checks whether the current sequence counter value obtained in act 412 is the same as the stored sequence counter value obtained in act 410 (act 414). If the two values are the same, then the generated value can be used (act 416).

However, if the two values are not the same, then the entropy pool of the guest operating system is cleared and regenerated (act 418). The requested value is regenerated (act 420), and the regenerated value can be used (act 422).

Figure 5:
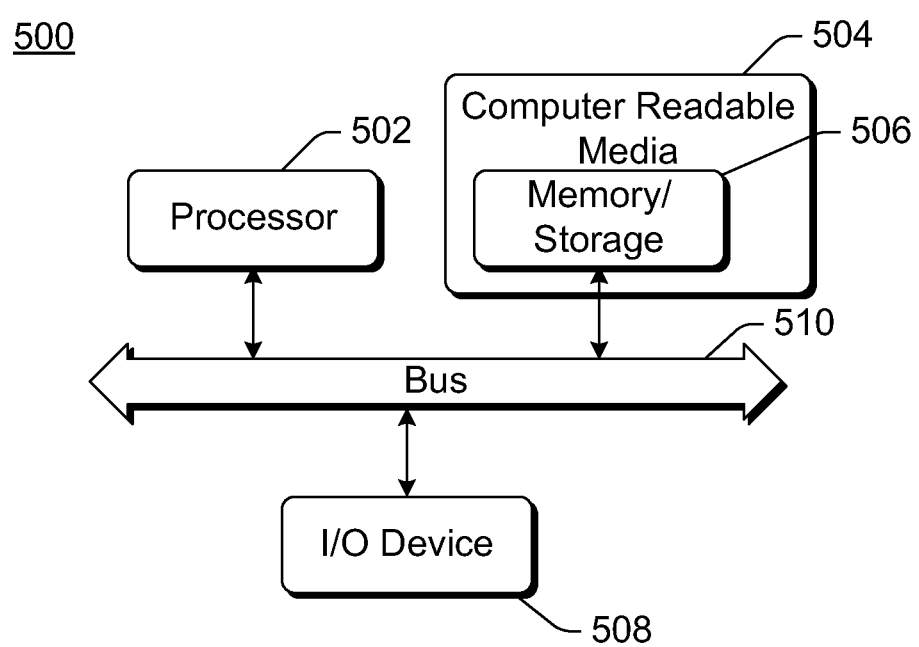
FIG. 5 illustrates an example computing device that can be configured to implement the entropy pools for virtual machines in accordance with one or more embodiments.

FIG. 5 illustrates an example computing device 500 that can be configured to implement the entropy pools for virtual machines in accordance with one or more embodiments. Computing device 500 can be, for example, computing device 100 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the entropy pools for virtual machines techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage devices having stored thereon instructions for a program managed by a virtual machine manager that, when executed by one or more processors of a computing device, cause the one or more processors to:
    access, through virtualized resources, an entropy pool generated based at least in part on each of one or more hardware components of the computing device, the program running in a virtualized hardware system, the entropy pool having been obtained from a host operating system on the computing device, wherein the entropy pool is transferred from the host operating system to a virtualized component of the virtual machine manager, stored in the virtualized component, and accessed by a guest operating system via the program managed by the virtual machine manager;
    use the entropy pool as a basis for generating a random number for creation of a cryptographic key;
    request additional entropy data from a host operating system;
    receive, from the host operating system, the additional entropy data; and
    incorporate the additional entropy data into the entropy pool of the program.

2. One or more computer storage devices as recited in claim 1, wherein at least a portion of the entropy pool is mapped into a memory space of the virtual machine manager by the host operating system.

3. One or more computer storage devices as recited in claim 1, wherein the entropy pool is obtained from the host operating system via a basic input/output system (BIOS) table of the program.

4. One or more computer storage devices as recited in claim 1, the instructions further causing the one or more processors to:
    receive the additional entropy data from the host operating system at particular intervals.

5. One or more computer storage devices as recited in claim 1, the instructions further causing the one or more processors to:
    obtain a first sequence counter value for the program; and
    store the random number and the first sequence counter value for the program.

6. One or more computer storage devices as recited in claim 5, the instructions further causing the one or more processors to:
    receive a request to use the random number;
    obtain the stored first sequence counter value;
    obtain a second sequence counter value for the program when the request is received;
    compare the second sequence counter value to the first sequence counter value;
    use the random number based at least on the first sequence counter value and the second sequence counter value being the same;
    based at least on the first sequence counter value and the second sequence counter value not being the same:
        regenerate the entropy pool of the program,
        generate a new random number based on the regenerated entropy pool, and
        use the new random number.

7. A method in a computing device, the method comprising:
    collecting entropy data based at least in part on each of one or more hardware components of the computing device;
    updating an entropy pool on a host operating system based at least in part on the collected entropy data;
    providing data from the entropy pool on the host operating system to an entropy pool existing on a guest operating system running as a virtual machine of the computing device, wherein the data provided to the entropy pool existing on the guest operating system is used to generate a first random number, and wherein providing the data from the entropy pool to the guest operating system comprises providing the data from the entropy pool to the guest operating system at least when the guest operating system is booted;
    cloning the guest operation system;
    changing, in response to the guest operating system being cloned, a first sequence counter value for a first copy of the guest operating system and keeping a second sequence counter value for a second copy of the guest operating system unchanged;
    storing one of the first sequence number or the second sequence number as a current sequence number;
    providing data from the entropy pool on the host operating system to an entropy pool on the cloned virtual machine and using the entropy pool on the cloned virtual machine to generate a second random number; and
    determining whether to use one of the first random number of the second random number based at least on whether the first sequence number or the second sequence number matches the current sequence number.

8. A method as recited in claim 7, further comprising providing additional data from the entropy pool to the guest operating system while the guest operating system is running.

9. A method as recited in claim 8, further comprising providing the additional data from the entropy pool to the guest operating system in response to a request for additional entropy from the guest operating system.

10. A method as recited in claim 8, further comprising:
    collecting additional entropy data based at least in part on each of the one or more hardware components of the device; and
    updating the entropy pool based at least in part on the additional collected entropy data.

11. A method as recited in claim 7, wherein providing the data from the entropy pool to the guest operating system comprises including at least part of the entropy pool in a memory space of the virtual machine where a basic input/output system (BIOS) table used by the guest operating system is stored.

12. A method as recited in claim 7, wherein the method is implemented in a host operating system of the computing device.

13. A method as recited in claim 7, wherein the first copy comprises a saved snapshot copy of the guest operating system, and the second copy comprises a copy of the guest operating system that continues running.

14. A method in a guest operating system of a computing device, the method comprising:
   generating a value based on an entropy pool, the entropy pool existing on the guest operating system, the entropy pool having been obtained from another entropy pool existing on a host operating system on the computing device;
   obtaining a first current sequence counter value for the guest operating system when the value is generated;
   storing a record of the generated value and the first current sequence counter value for the guest operating system;
   receiving a request to use the generated value;
   obtaining the stored first current sequence counter value;
   obtaining a second current sequence counter value for the guest operating system when the request is received;
   comparing the first current sequence counter value to the second current sequence counter value;
   based at least on the first current sequence counter value and the second current sequence counter value being the same, then using the generated value for creation of a cryptographic key; and
   based at least on the first current sequence counter value and the second current sequence counter value not being the same:
      regenerating the entropy pool,
      generating a new value based on the regenerated entropy pool, and
      using the new value for creation of a cryptographic key.

15. A system comprising:
   one or more processors; and
   one or more computer-readable media having stored thereon computer-executable instructions that are executable by the one or more processors to perform operations including:
      collecting entropy data based at least in part on each of one or more hardware components of the computing device;
      updating an entropy pool on a host operating system based at least in part on the collected entropy data;
      providing data from the entropy pool on the host operating system to an entropy pool existing on a guest operating system running as a virtual machine of the computing device, wherein the data provided to the entropy pool existing on the guest operating system is used to generate a first random number, and wherein providing the data from the entropy pool to the guest operating system comprises providing the data from the entropy pool to the guest operating system at least when the guest operating system is booted;
      cloning the guest operating system;
      changing, in response to the guest operating system being cloned, a first sequence counter value for a first copy of the guest operating system and keeping a second sequence counter value for a second copy of the guest operating system unchanged;
      storing one of the first sequence number or the second sequence number as a current sequence number;
      providing data from the entropy pool on the host operating system to an entropy pool on the cloned virtual machine and using the entropy pool on the cloned virtual machine to generate a second random number; and
      determining whether to use one of the first random number of the second random number based at least on whether the first sequence number or the second sequence number matches the current sequence number.

16. The system of claim 15, further comprising providing additional data from the entropy pool to the guest operating system while the guest operating system is running.

17. The system of claim 16, further comprising providing the additional data from the entropy pool to the guest operating system in response to a request for additional entropy from the guest operating system.

18. The system of claim 16, further comprising:
   collecting additional entropy data based at least in part on each of the one or more hardware components of the device; and
   updating the entropy pool based at least in part on the additional collected entropy data.

19. The system of claim 15, wherein providing the data from the entropy pool to the guest operating system comprises including at least part of the entropy pool in a memory space of the virtual machine where a basic input/output system (BIOS) table used by the guest operating system is stored.

20. The system of claim 15, wherein the method is implemented in a host operating system of the computing device.

21. The system of claim 15, wherein the first copy comprises a saved snapshot copy of the guest operating system, and the second copy comprises a copy of the guest operating system that continues running.

22. A system comprising:
   one or more processors; and
   one or more computer-readable media having stored thereon computer-executable instructions that are executable by the one or more processors to perform operations including:
      generating a value based on an entropy pool, the entropy pool existing on the guest operating system, the entropy pool having been obtained from another entropy pool existing on a host operating system on the computing device;
      obtaining a first current sequence counter value for the guest operating system when the value is generated;
      storing a record of the generated value and the first current sequence counter value for the guest operating system;
      receiving a request to use the generated value;
      obtaining the stored first current sequence counter value;
      obtaining a second current sequence counter value for the guest operating system when the request is received;
      comparing the first current sequence counter value to the second current sequence counter value;
      based at least on the first current sequence counter value and the second current sequence counter value being the same, then using the generated value for creation of a cryptographic key; and based at least on the first current sequence counter value and the second current sequence counter value not being the same, then:
regenerating the entropy pool,
generating a new value based on the regenerated entropy pool, and
using the new value for creation of a cryptographic key.

* * * * *